May 9, 1967　　　　　　　J. W. WRIN　　　　　　　3,319,073
TURN SIGNAL TIMING DEVICE
Filed July 12, 1963　　　　　　　　　　　　　　　2 Sheets-Sheet 1

INVENTOR.
JOHN W. WRIN
BY
MAHONEY, HALBERT &
HORNBAKER
ATTORNEYS

INVENTOR.
JOHN W. WRIN
BY
MAHONEY, HALBERT &
HORNBAKER
ATTORNEYS

United States Patent Office 3,319,073
Patented May 9, 1967

3,319,073
TURN SIGNAL TIMING DEVICE
John W. Wrin, Palmdale, Calif., assignor of one-half to
Duard E. Goble, Fillmore, Calif.
Filed July 12, 1963, Ser. No. 294,768
22 Claims. (Cl. 307—10)

This invention relates to a device for timing the duration of an electrical circuit, and more particularly, to a device for automatically turning off a visible vehicular turn indicator after a predetermined period of electrical energization.

Visible turn indicators have virtually become standard equipment on all modern motor vehicles, and in fact most, if not all, vehicular licensing authorities require licensed vehicles to be equipped with visible turn indicators. The most acceptable and most widely used turn indicator is, of course, the indicator which provides a pair of electric lights mounted at the rear of the body of the vehicle in position to be readily viewed by the operator of a following vehicle and arranged for manual energization by the driver so that, when the driver intends a left-hand turn, he moves a lever in one direction to close an electrical switch so that the light mounted on the left-hand side of his vehicle will light up and flash a warning, and when he intends a right-hand turn, he moves the lever in another direction to close another electrical switch so that the light on the right-hand side of his vehicle will similarly light up and flash.

Modern turn indicators also provide an automatic method of opening the applicable switch so as to shut off the turn indicator light when the turn has been completed. This additional feature, obviously, provides an added, important safety factor, because it is obvious that under present day high speed motor vehicle operation, particularly on multi-lane highways, it is extremely dangerous to confuse operators of following vehicles by continuous lighting and flashing of a turn indicator when no turn is intended.

However, the automatic turn-off provisions of turn indicators are often deficient in that they depend for their automatic operation on the completion of a substantial degree of turn, followed by a return to normal forward driving position, and unless that degree of turn has been accomplished, they will not act to shut off the turn indicator. Unless the driver of a vehicle so equipped remembers to manually shift his lever to accomplish the shut off, his vehicle will proceed along the highway with his turn indicator continuously warning of a turn which is not intended. The resulting confusion to following motorists and the potential danger factors are obvious.

For example, assume that a vehicle is proceeding in the right-hand lane of a modern high speed highway and approaches a slower moving small vehicle, such as a motor scooter, proceeding in the center of the right-hand lane, which scooter the driver desires to pass. After looking in his rear view mirror and determining that the lane to his left is clear, the driver manipulates his turn indicator lever to indicate a left-hand turn. He then starts to execute his turn, but at a time when the motor scooter operator moves to the right so as to open the right-hand lane substantially. Then it is not necessary for the driver who has indicated a left-hand turn to make a full swing into the next lane to the left. He makes a slight leftward turn, but only sufficient to pass the motor scooter, and then continues in the right-hand lane. Because his vehicle has not turned at an angle sufficient to energize his automatic shut-off on recovery, his vehicle will continue in the right-hand lane with his turn warning device still indicating a left-hand turn, unless he happens to notice the situation and manually turns it off.

If it is then assumed that he proceeds for several miles with his turn indicator flashing a left turn warning, and is now followed by another fast moving vehicle, the following driver is confused as to the first driver's intentions. If then another slow moving vehicle is overtaken, and the driver is required to move fully into the left lane to pass, he finds that his left turn indicator is already activated, and he has no mechanical way of indicating to the following vehicle that he now intends a full turn into the left lane. If the operator of the following vehicle believes that no turn is intended and proceeds to pass both vehicles in the left lane, the danger is obvious.

Similarly, potential danger is apparent when a vehicle equipped with front-mounted turn indicators inadvertently continuously flashes a turn signal at a time when no turn is intended, especially when the vehicle is being driven through busy street intersections in populous areas.

It is, therefore, an object of the present invention to provide a turn indicator which has combined therein a timing device which will operate to open electrical circuits and shut off the turn indicator after a predetermined time lapse, even though the degree of turn and recovery normally required to shut off the indicator has not been accomplished.

It is a further object of the invention to provide such an added safety factor by simplified means which are readily accomplished, and which will not substantially increase the cost of the turn indicator or its installation.

With these and other objects in view, the invention consists of the construction, arrangement and combination of the various elements of the device whereby the objects contemplated are attained, as hereinafter set forth, pointed out in the appended claims, and illustrated in the accompanying drawings.

Figure 1:
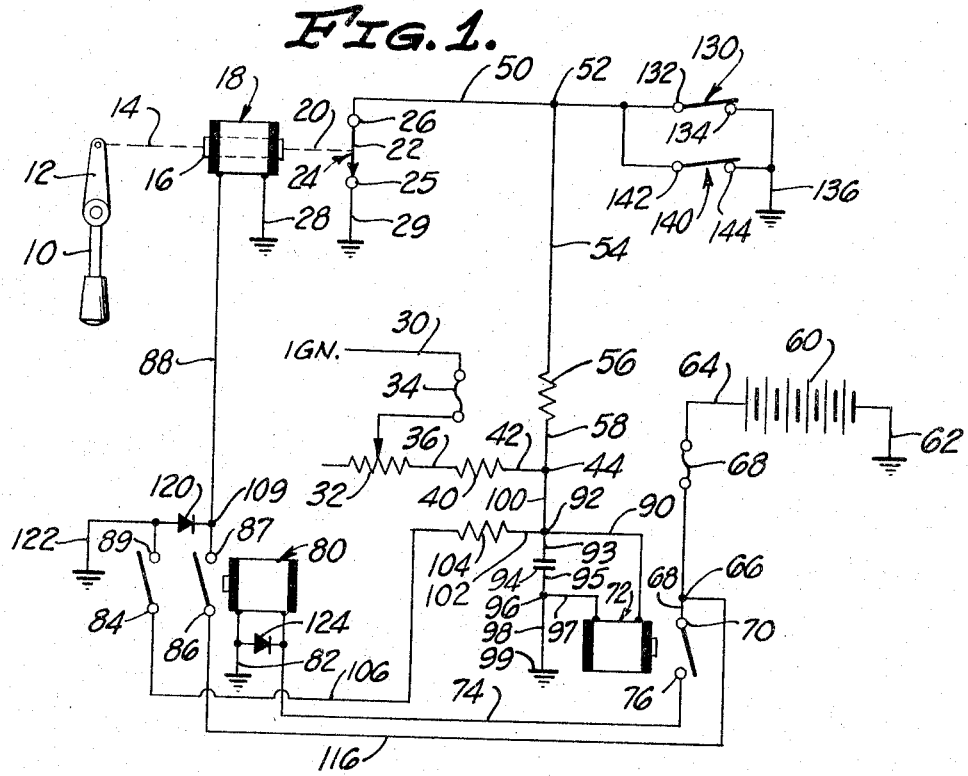
FIG. 1 is a diagrammatic representation of the preferred form of the device of the present invention and the electrical circuits applicable thereto.

Referring to the drawings, and particularly to FIG. 1 thereof, a lever arm 10 is pivotally mounted adjacent to a vehicle's steering wheel in the standard manner for manual operation of a turn indicator. The lever 10 functions to manually operate the normal turn signal switch system, which is not herein illustrated, the drawings being illustrative of the device of the present invention only.

Mounted on the lever arm 10 is a bracket 12. A first mechanical linkage 14 inter-connects the bracket 12 and one end of a plunger 16 of a recentering solenoid 18. A second mechanical linkage 20 inter-connects the other end of the plunger 16 and a blade 22 of a switch generally designated 24. The switch 24 has one pole 25 and a second pole 26 on which blade 22 is pivotally mounted. Solenoid 18 is suitably grounded, as illustrated at 28, and the pole 25 of switch 24 is also suitably grounded, as illustrated at 29.

It will be readily understood that, in lieu of the plunger type solenoid 18 hereinabove described, another suitable type of actuator, as, for instance, a rotary type solenoid, may be provided to operate the switch 24 and recenter the lever 10 as hereinafter described, the plunger type solenoid 18 being described by way of illustration only, and not by way of limitation.

From the vehicle's ignition switch (not illustrated, but designated IGN in the drawings), an electric circuit line 30 leads to a variable resistor 32. Preferably, a fuse 34 is mounted on line 30 intermediate the ignition switch and the resistor 32.

A line 36 leads from the variable resistor 32 to a second resistor 40, and a line 42 leads from the resistor 40 to a junction 44.

A line 50 leads from the pole 26 of the switch 24 to a junction 52, and a line 54 leads from the junction 52 to a third resistor 56. A line 58 leads from the resistor 56 to the junction 44.

A suitable source of electric energy, such as a 12-volt battery 60, grounded as at 62, is electrically connected by a line 64 to a junction 66. Preferably, a fuse 68 is mounted on the line 64 intermediate the battery 60 and the junction 66.

From the junction 66 a line 68 leads to a pole 70 of a relay switch generally designated 72, and a line 74 leads from a pole 76 of the relay switch 72 to a relay generally designated 80. Relay 80 is suitably grounded, as at 82.

A line 90 inter-connects relay switch 72 and a junction 92. From junction 92 a second line 93 leads to a capacitor 94, and a line 95 leads from the capacitor 94 to a junction 96. A third line 97 inter-connects the junction 96 and the relay switch 72, while a fourth line 98 leads from the junction 96 to a suitable ground 99.

Another line 100 inter-connects the junction 92 and the junction 44, while still another line 102 electrically connects the junction 92 with a resistor 104.

One pole 84 of the relay 80 is connected to the resistor 104 by the line 106. Another pole 86 of the relay 80 is connected to the junction 66 by the line 116.

A third pole 87 of the relay 80 is electrically interconnected with the solenoid 18 by the line 88. The relay 80 has a fourth pole 89, and interposed between the poles 87 and 89 is a diode 120, said pole 89 being suitably grounded, as at 122.

A second diode 124 is interposed between the line 74 and the ground 82. The diodes 120 and 124 are provided to reduce or prevent arcing.

A switch 130 is provided. One pole 132 of the switch 130 is electrically connected to the pole 26 of the switch 24 by way of the junction 52 and the line 50. Another pole 134 of the switch 130 is suitably grounded, as at 136.

The switch 130 is mechanically connected to the vehicle's accelerator (by means not shown) so that the switch 130 will open at a setting of the accelerator for predetermined vehicular speeds in excess of, say, 20 m.p.h.

A switch 140 is also provided. One pole 142 of the switch 140 is also electrically connected to the pole 26 of the switch 24 by way of the junction 52 and the line 50. Another pole 144 of the switch 140 is suitably grounded, as at 136.

The switch 140 is activated by the vehicle's transmission (not shown) by mechanical, hydraulic, or other suitable means (also not shown) so that the switch 140 will be closed when the vehicle is in low gear, and open in higher gears.

The function of the switch 140 is to prevent an inadvertent turn-off of the indicator when the vehicle is proceeding in low gear, as, say, under heavy traffic conditions.

In operation of the form of the invention illustrated in FIG. 1 of the drawings, when the ignition switch IGN is closed and the vehicle is proceeding with no turn intended or indicated, the switch 24 is closed, and the voltage between the resistor 40 and the resistor 56 is preferably held at approximately .1 volt by the flow of current through the variable resistor 32, the resistor 40, the resistor 56, the switch 24, and the ground 29.

When the operator of the vehicle then desires to make a right or left turn, and wishes to so indicate his intention, he manipulates the lever 10 in the normal manner to activate his turn indicator. When he does so, the plunger 16 of the solenoid 18 is moved by its mechanical interconnection 14 to the bracket 12 either to the right or left, as the case may be, thus moving the blade 22 of the switch 24 to the right or left to open the switch 24. The path of current flow in the device of the present invention is then through the variable resistor 32, the resistor 40, and the relay 72 to the ground 99.

The relay 72 is a sensitive relay with 13K ohms resistance in its coil. The relay 72 energizes at 6.6 volts with .5 milliampere of current. The high resistance of the relay 72 causes the capacitor 94 to eventually charge to a value above the energizing voltage of the relay 72, due to the high capacity of the capacitor 94 and the resistance of the variable resistor 32 and the resistor 40 in the charging path of the capacitor 94.

The predetermined setting of the variable resistor 32 determines the delay time before the relay 72 will energize, and consequently the charge time of the capacitor 94 is regulated by the predetermind setting of the variable resistor 32. The current bled from the capacitor 94 by the relay 72 during charging time is negligible. Thus, the variable resistor 32 and the capacitor 94 are the primary determinants of the time constant.

The resistor 40 prevents the adjustment of the delay time to zero, and consequently the relay 72 is not continuously energized.

Current from the battery 60, passing through the energized relay 72, energizes the relay 80, which in turn energizes the solenoid 18. The relay 80 is provided because the contact rating of the relay 72 would otherwise be insufficient to carry energizing current for the solenoid 18.

As the solenoid 18 is energized, it recenters the plunger 16 from either the right or left position of the plunger 16, turning off the turn indicator by moving the lever 10 to the turn indicator's "off" position, and closing the switch 24, thus grounding the resistor 56. At the same time, the capacitor 94 discharges rapidly, dropping out the relay 72 and the relay 80. The device of the present invention thus having turned off the indicator returns to its original quiescent state.

Duty cycle limiting of preferably one second is provided for the solenoid 18 if the lever 10 is manually restrained after the relay 80 is energized to prevent overheating the solenoid 18, which draws too much current for continuous operation. When the relay 80 is energized, a discharge path is provided for the capacitor 94 through the resistor 104 and the contacts of the relay 80 to the ground 82. After the one second, the capacitor 94 will discharge to the drop-out voltage of the relay 72 and the relay 80, and the circuit will recycle with a shorter than normal delay time.

The switch 130 functions by its mechanical connection to the vehicle's accelerator to de-activate the timing circuit of the device of the present invention for throttle settings of, say, less than 20 m.p.h. in top driving gear.

Contact arcing is reduced by the resistor 56, the diode 120, and the diode 124.

While the device and system illustrated in FIG. 1 of the drawings is readily adapted for use with a present turn indicator already installed in a vehicle, the device and system illustrated in FIGS. 2–5 of the drawings are intended for installation in a vehicle at the time of manufacture of the vehicle. It will be readily seen that one relay of the FIG. 1 device is eliminated, and the recentering solenoid 18 is replaced by a small latching relay hereinafter described. A timer over-ride is also illustrated and described.

In this form of the invention, a latching relay 200, having a latching and recentering spring 202 is suitably grounded, as at 204. The latching relay 200 is electrically connected by a line 206 to one pole 210 of a relay 212. The relay 212 is also electrically connected to the ignition switch IGN by means of a line 213 by way of a second pole 214 of the relay 212, and a fuse 215 may be interposed on the line 213. A third pole 216 is provided for the relay 212 for use in inter-connecting the alternative form of lever assembly illustrated in FIG. 5 of the drawings and hereinafter described.

A variable resistor 220 is electrically connected to the line 213 by means of, say, a junction 222 and a line 224. A line 226 connects the variable resistor 220 with a second resistor 230, and the resistor 230 is connected to the relay 212 by the line 232.

The relay 212 is connected to a suitable ground 234 by a line 236. Interposed between the line 232 and the line 236 is a capacitor 240.

A diode 250 is electrically connected to the line 206 intermediate the latching relay 200 and the relay 212, as by a line 252 from a junction 254 on the line 206 to the diode 250. The diode 250 is suitably grounded, as at 256.

A normally closed switch 260 is provided. The switch 260 has a pole 262 which is suitably grounded, as at 264. A blade 266 of the switch 260 is pivotally mounted on the pole 262 and makes contact with a second pole 267 of the switch 260. The blade 266 is mechanically connected by a mechanical interlock 268 to a lever hereinafter described.

A line 270 connects the pole 267 of the switch 260 with a third resistor 272, and the resistor 272 is connected by a line 274 to a junction 276 on the line 232 intermediate the resistor 230 and the capacitor 240 and the relay 212.

A switch 300, similar to the switch 130 shown in FIG. 1 of the drawings, is provided. One pole 302 of the switch 300 is electrically conneced to the pole 267 of the switch 260 by way of a line 304, junction 306 on the line 270 intermediate the pole 267 and the resistor 272. Another pole 308 of the switch 300 is suitably grounded as at 309. As in the case of the switch 130 of FIG. 1, the switch 300 is mechanically connected to the vehicle's accelerator so that the switch 300 will open at a setting of the accelerator for predetermined vehicular speeds in excess of, say, 20 m.p.h.

A second switch 310, similar to the switch 140 of FIG. 1, is also provided. One pole 312 of the switch 310 is also electrically connected to the pole 267 of the switch 260 by way of a junction 314 on the line 304 intermediate the pole 267 of the switch 260 and the pole 302 of the switch 300. Another pole 316 of the switch 310 is suitably grounded, as at 309.

Like the switch 140, the switch 310 is activated by the vehicle's transmission so that the switch 310 will be closed when the vehicle is in low gear, and open in higher gears, its function being to prevent an inadvertent turn-off of the indicator when the vehicle is proceeding in low gear, as, say, under heavy traffic conditions.

In this form of the device, a lever arm 410 for manual operation of the turn indicator is pivotally mounted adjacent the vehicle's steering wheel, the lever arm 410 being similar in function to the lever arm 10 in the first form of the invention illustrated in FIG. 1 of the drawings. The lever arm 410 is pivotally mounted as at 412.

Mounted on the lever arm 410 at the pivot point 412 is a quadrant 414 having a centrally disposed notch 415 in the arced surface of the quadrant 414, and other notches 416 disposed laterally of the notch 415. The notches 415 and 416 are adapted to receive a roller 417 on the end of a pivotally mounted latching arm 418 of the latching relay 200. The spring 202 of the relay 200 is mounted on the other end of the arm 418. The arm 418 being pivotally mounted on the relay 200 intermediate the ends of the arm 418, the action of the spring 202 is such as to bias the roller 417 into the notches 415 and 416. A spring 419, disposed so as to bias the quadrant 414 to center position, with the roller 417 disposed in the notch 415, is provided.

Figure 3:
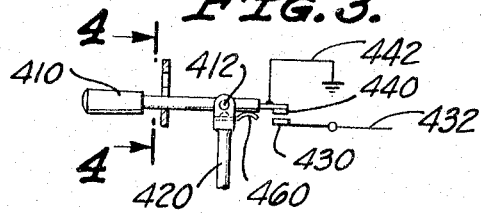
FIG. 3 is a view taken on line 3—3 of FIG. 2.

Shaft 420, shown in FIG. 3 of the drawings, is illustrative of the normal means of operating the standard turn signal indicator upon movement of the lever arm 410.

A first electrical contact 430 is provided, the contact 430 being electrically connected to the electric circuit of the device of the present invention, as by a line 432 connected to the line 270 at a junction 434. A second electrical contact 440 is mounted adjacent one end of the lever arm 410 and disposed so as to make contact with the first contact 430 when the other end of the pivotally mounted lever arm 410 is moved in the opposite direction and held in such contact in the manner hereinafter described. The second contact 440 is suitably grounded, as at 442.

Figure 4:
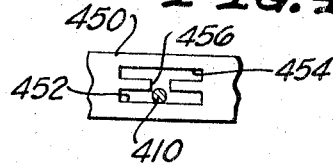
FIG. 4 is a view taken on line 4—4 of FIG. 3.

The lever arm 410 is slidably disposed in a track 450 of H configuration, best shown in FIG. 4 of the drawings. The track 450 as illustrated has a lower slot 452, an upper slot 454, and a transverse slot 456.

Normally, the lever arm 410 will be disposed in the lower slot 452. However, under certain driving conditions, it may be desirable to override the timing circuit of the device of the present invention, as when an indicated turn may not be accomplished in the time cycle provided. Under such a circumstance, the operator of the vehicle may manually move the lever arm 410 so that it passes through the transverse slot 456 and is lodged in the upper slot 454, whereupon contact will be made between the contact 440 and the contact 430, thus grounding the system through the ground 442, thereby rendering relay 200 inoperative.

A spring 460, shown in FIG. 3 of the drawings, may be provided, the spring 460 being disposed so as to bias the lever arm 410 toward the lower slot 452 of the track 450, so that, when the desired indicated turn has been accomplished under override conditions, the lever arm 410 will return to its normal disposition in the lower slot 452.

Figure 2:
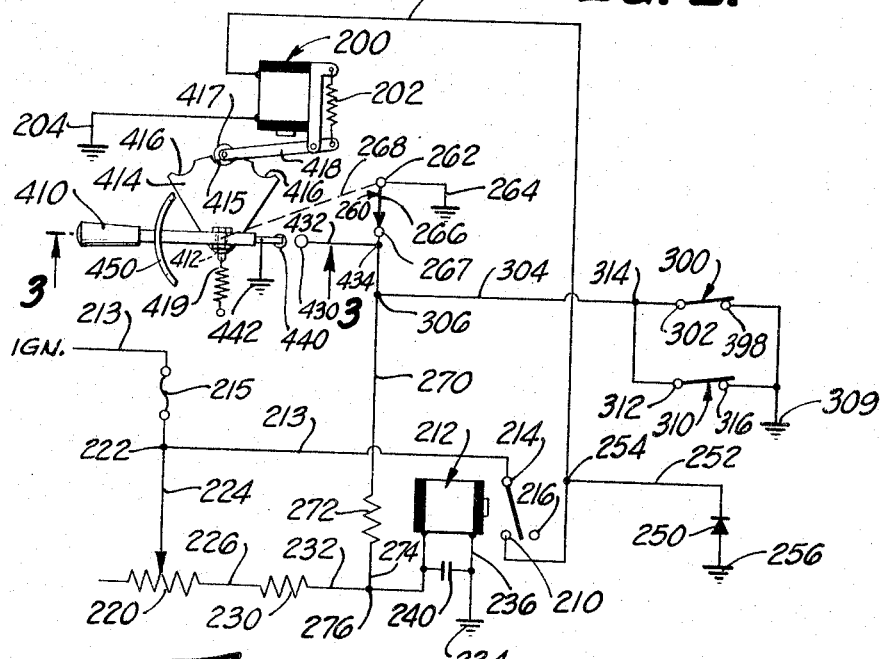
FIG. 2 is a view similar to FIG. 1, but showing an alternative form of the device of the present invention.

In operation of the form of the invention illustrated in FIGS. 2–4 of the drawings, when the ignition switch IGN is closed and the vehicle is proceeding with no turn intended or indicated, the switch 260 is closed, and the voltage between the resistor 230 and the resistor 272 is held at approximately .1 volt by the flow of current through the variable resistor 220, the resistor 230, the resistor 272, the switch 260 and the ground 264.

When the operator of the vehicle then desires to make a right or left turn and to so indicate his intention, he manipulates the lever arm 410 in the normal manner to activate his turn indicator. Prior to such manipulation, the roller 417 of the latching arm 418 will be disposed in the centrally disposed notch 415 of the quadrant 414, and as the lever arm 410 is manipulated to indicate a right or left turn, the quadrant 414 will move, and the roller 417 of the latching arm 418 will be disposed in either of the notches 416, and will be held in that position by the spring 202 of the latching relay 200, the latching relay 200 being de-energized. At the same time, by reason of the mechanical inter-connection 268 of the lever arm 410 with the switch 260, the switch 260 will open. The path of current flow is then through the variable resistor 220, the resistor 230, and the relay 212 to the ground 234.

The relay 212 is a sensitive relay with 13K ohms resistance in its coil. The relay 212 will energize at 6.6 volts with .5 milliampere of current. The high resistance of the relay 212 causes the capacitor 240 to eventually charge to a value about the energizing voltage of the relay 212, due to the high capacity of capacitor 240 and the resistance of the variable resistor 220 and the resistor 230 in the charging path of the capacitor 240.

The predetermined setting of the variable resistor 220 determines the delay time before the relay 212 will energize, and consequently the charging time of the capacitor 240 is regulated by the predetermined setting of the variable resistor 220. The current bled from the capacitor 240 by the relay 212 during charging time is negligible. Thus, the variable resistor 220 and the capacitor 240 are the primary determinants of the time constant.

The resistor 230 prevents the adjustment of the time delay to zero, and consequently the relay 212 is not continuously energized.

The latching relay 200 will then be energized and will lift the latching arm 418, thus removing the roller 417 from either of the notches 416. The roller 417 is then re-positioned in the notch 415 by means of the biasing action of the spring 419. The lever 410 then returns to its "off" position, again closing the switch 260, thus discharging the capacitor 240 through the resistor 272, and through the ground 264. The device of FIGS. 2–4 having turned off the indicator, thus returns to its original quiescent state.

The switch 300 functions by its mechanical connection with the vehicle's accelerator to de-activate the timing circuit of the device of FIGS. 2–4 for throttle settings of, say, less than 20 m.p.h. in top driving gear.

Contact arcing is reduced by the resistor 272 and the diode 250.

Figure 5:
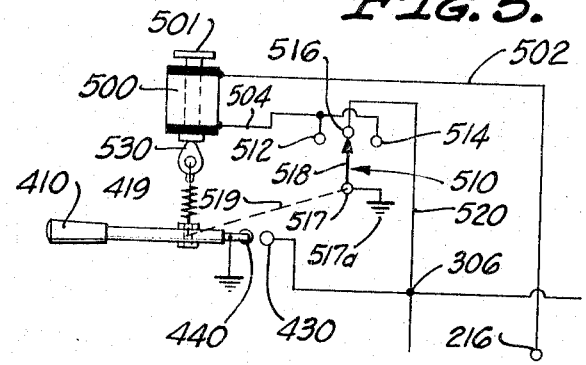
FIG. 5 is a diagrammatic representation of an alternative form of the lever assembly illustrated in FIG. 2.

The alternate form of the device of the present invention illustrated in FIG. 5 of the drawings is quite similar to the form of the device illustrated in FIGS. 2–4 of the drawings, except that, in lieu of the relay 200 which functions to unlatch the lever arm 410, a solenoid 500 having a plunger 501 is provided, the function of the solenoid 500 being to latch the lever arm 410 in position. In the form of the device of FIG. 5, the solenoid 500 is electrically connected to the system illustrated in FIG. 2 by a line 502 passing from the pole 216 of the relay 212 to the solenoid 500. A second line 504 electrically connects the solenoid 500 to a switch 510 by way of poles 512 and 514 of the switch 510.

The switch 510 has a third pole 516 disposed intermediate the poles 512 and 514, and a fourth pole 517 on which a contact blade 518 is pivotally mounted. The pole 517 is suitably grounded as at 517a. The blade 518 is mechanically connected to the lever arm 410 by a mechanical connection 519, so that movement of the lever arm 410 to indicate either a right or left turn on the turn indicator will move the blade 518 of the switch 510 from its contact with pole 516 to contact with either pole 512 or pole 514, as the case may be.

The pole 516 of the switch 510 is electrically connected to the system of FIG. 2 by means of a line 520 running from the pole 516 to the junction 306.

A cam 530 is mounted on the lever arm 410 in position to be engaged by the plunger 501 of the solenoid 500.

When the driver of the vehicle wishes to indicate either a right or left turn, he moves the lever arm 410 accordingly, and the blade 518 of the switch 510 will move to contact with either pole 512 or pole 514, as the case may be, thus grounding the solenoid 500 through the ground 517a to energize the solenoid 500.

The plunger 501 of the solenoid 500 then engages the cam 530 to hold the lever arm 410 in its selected position.

When the timing circuit shown in FIG. 2 has energized the relay 212 and the timing cycle has been completed, the circuit to the solenoid 500 will be broken, and disengagement of the plunger 501 with the cam 530 will occur, permitting the return of the lever arm 410 to its spring biased "off" position, at which point the blade 518 of the switch 510 will return to contact with the pole 516, thus breaking the circuit to the solenoid 500 until such time as another turn selection is made.

Figure 6:
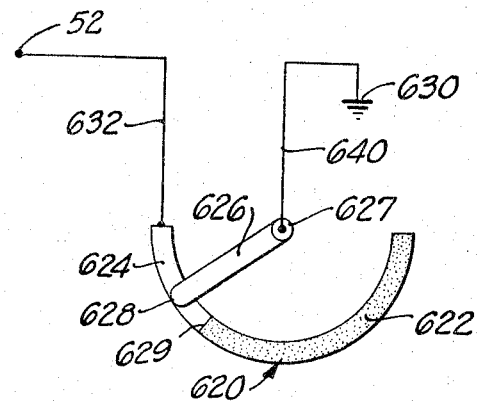
FIG. 6 is a diagrammatic representation of an alternative form of timing control of the device.

Referring to the alternate form of timing control of the device illustrated in FIG. 6 of the drawings, in lieu of the switches 130 and 140 of FIG. 1, a speed sensing device generally designated 620 is provided. Said speed sensing device 620 has an insulated portion 622 and a conductor portion 624. A conductor arm 626 is pivotally mounted at one end 627 thereof. Another end 628 of the arm 626 makes contact with the insulated portion 622 and the conductor portion 624 of the speed sensing device 620. The dividing line 629 between the insulated portion 622 and the conductor portion 624 of the speed sensing device 620 is preferably disposed at a point on the speed sensing device 620 which indicates a vehicular speed of 20 m.p.h.

The end 627 of the arm 626 is electrically connected to a suitable ground 630 by a line 640, and the conductor portion 624 of the speed sensing device 620 is electrically connected to the junction 52 by a line 632.

In operation of the form of timing control illustrated in FIG. 6 of the drawings, when the vehicle is proceeding at a speed under, say, 20 m.p.h., the arm 626 will be in contact with the conductor portion 624 of the speed sensing device 620, and the system will be grounded through the ground 630, rendering the entire timing system inoperative, so that the turn signal indicator will not be turned off by the timing system at slow speeds or when the vehicle is stopped. At vehicular speeds exceeding 20 m.p.h., the arm 626 will be in contact with the insulated portion 622 of the speed sensing device 620, and the timing system will be operative.

In operation it has been found practical to arrange the timing circuit of the device of the present invention so that it will operate at vehicular speeds exceeding 20 m.p.h., because the danger factor decreases to a minimum below that speed. Furthermore, it has been found advantageous to adjust the timing circuit for operation in a time range of from one second to two minutes, and a time setting of thirty seconds has been found to be adequate for normal driving conditions. However, the vehicular speed and timing herein suggested are given by way of illustration, and are not intended as limitations.

Although the invention has been herein shown and described in what are conceived to be the most practical and preferred embodiments thereof, it is recognized that departures may be made therefrom within the scope of the invention, which is not to be limited to the details disclosed herein, but is to be accorded the full scope of the claims so as to embrace any and all equivalent structures and devices.

I claim:

1. A device for timing the duration of operation of a vehicular turn indicator which comprises:
    (a) a lever arm for manually controlling a vehicular turn indicator, the lever arm being movable from a dormant position of a position for indicating a right or a left vehicular turn;
    (b) a normally closed electrical switch;
    (c) actuator means interconnecting the switch and the lever arm for opening the switch upon movement of the lever arm from dormant position, and for returning the lever arm to dormant position upon closing of the switch;
    (d) a source of electrical energy;
    (e) a suitably grounded, high resistance relay electrically connected to the source of electrical energy and having contacts;
    (f) a capacitor electrically connected across said relay and having one end connected to the switch and another end connected to ground;
    (g) resistor means interposed in the charging path of the capacitor between said source of electrical energy and ground, the resistor means being electrically connected to the vehicle's ignition switch so as to be energized when the ignition switch is closed; and
    (h) means connecting said source of electrical energy through said contacts to said actuator means.

2. A device as defined in claim 1, wherein the resistor means includes a variable resistor.

3. A device as defined in claim 1, including a second electrical switch electrically connected to the first switch, the second switch being mechanically linked to a vehicular speed sensing device.

4. A device as defined in claim 1, including a second relay electrically connected to the actuator means and electrically connected to the first relay.

5. A device as defined in claim 4, including resistor means interposed between the first relay and the second relay.

6. A device for timing the duration of operation of a vehicular turn indicator which comprises:
(a) a lever arm for manually controlling a vehicular turn indicator, the lever arm being movable from a dormant position to a position for indicating a right or a left vehicular turn;
(b) a suitably grounded electrical actuator mechanically linked to the lever arm;
(c) a first normally closed and suitably grounded electrical switch mechanically linked to the actuator, the lever arm, the actuator and the switch being disposed relative to each other so as to open the switch upon movement of the lever arm from dormant position, and so as to return the lever arm to dormant position upon closing of the switch;
(d) a second electrical switch electrically connected to the first switch, the second switch being mechanically linked to a vehicular speed sensing device;
(e) a source of electrical energy;
(f) a first suitably grounded relay electrically connected to the source of electrical energy;
(g) a second suitably grounded relay electrically connected to the first relay and to the actuator;
(h) a first variable resistor electrically connected to the vehicle's ignition switch;
(i) a second resistor electrically connected to the first variable resistor;
(j) a third resistor electrically connected to the second resistor and to the first switch;
(k) a suitably grounded capacitor electrically connected to the first relay and to the third resistor; and
(l) a fourth resistor electrically connected to the second relay and to the capacitor.

7. A device as defined in claim 6, including a third electrical switch electrically connected to the first switch, the third switch being mechanically linked to the vehicle's transmission.

8. A device as defined in claim 6, wherein the actuator is a solenoid.

9. A device as defined in claim 8, wherein the solenoid is a re-centering plunger type solenoid.

10. A device for timing the duration of operation of a vehicular turn indicator which comprises:
(a) a lever arm for manually controlling a vehicular turn indicator, the lever arm being movable from a dormant position to a position for indicating a vehicular turn;
(b) a suitably grounded electrical actuator mechanically linked to the lever arm;
(c) a normally closed and suitably grounded electrical switch mechanically linked to the actuator, the lever arm, the actuator and the switch being disposed relative to each other so as to open the switch upon movement of the lever arm from dormant position, and so as to return the lever arm to dormant position upon closing of the switch;
(d) a source of electrical energy;
(e) a first suitably grounded, high resistance relay electrically connected to the source of electrical energy;
(f) a second suitably grounded relay electrically connected to the first relay and to the actuator;
(g) a first variable resistor electrically connected to the vehicle's ignition switch;
(h) a second resistor electrically connected to the first variable resistor;
(i) a third resistor electrically connected to the second resistor and to the switch;
(j) a suitably grounded capacitor of high capacity electrically connected to the first relay and to the third resistor; and
(k) a fourth resistor electrically connected to the second relay and to the capacitor.

11. A device as defined in claim 10, wherein the resistance in the coil of the first relay is 13K ohms.

12. A device as defined in claim 11, wherein the first relay is energizable at 6.6 volts with .5 milliampere of current.

13. A device for timing the duration of operation of a vehicular turn indicator which comprises:
(a) a lever arm for manually controlling a vehicular turn indicator, the lever arm being movable from a dormant position to a position for indicating a vehicular turn;
(b) a suitably grounded electrical actuator mechanically linked to the lever arm;
(c) a normally closed and suitably grounded electrical switch mechanically linked to the actuator, the lever arm, the actuator and the switch being disposed relative to each other so as to open the switch upon movement of the lever arm from dormant position, and so as to return the lever arm to dormant position upon closing of the switch;
(d) a source of electrical energy;
(e) a first suitably grounded, high resistance relay electrically connected to the source of electrical energy;
(f) a suitably grounded capacitor of high capacity electrically connected to the first relay and to the switch, the first relay being energized when the capacitor charges to a sufficient level;
(g) first resistor means interposed in the charging path of the capacitor to ground, the first resistor means being electrically connected to the vehicle's ignition switch so as to be energized when the ignition switch is closed;
(h) a second suitably grounded relay electrically connected to the actuator, and electrically connected to the first relay; and
(i) second resistor means interposed between the first relay and the second relay.

14. A device as defined in claim 13, wherein the first resistor means includes a variable resistor.

15. A device as defined in claim 14, including diodes electrically connected to the second relay and disposed so as to reduce contact arcing.

16. A device for timing the duration of operation of a vehicular turn indicator which comprises:
(a) a lever arm for manually controlling a vehicular turn indicator, the lever arm being movable from a dormant position to a position for indicating a vehicular turn;
(b) a suitably grounded electrical actuator mechanically linked to the lever arm;
(c) a normally closed and suitably grounded electrical switch mechanically linked to the actuator, the lever arm, the actuator and the switch being disposed relative to each other so as to open the switch upon movement of the lever arm from dormant position, and for returning the lever arm to dormant position upon closing of the switch;
(d) a source of electrical energy;
(e) a suitably grounded, high resistance relay electrically connected to the source of electrical energy, and electrically connected to the actuator;
(f) a suitably grounded capacitor of high capacity, electrically connected to the relay and to the switch, the relay being energized when the capacitor charges to a sufficient level; and
(g) resistor means electrically connected to the vehicle's ignition switch, and electrically connected in the charging path of the capacitor to ground.

17. A device as defined in claim 16, wherein the lever arm is spring-biased, and wherein the actuator is a solenoid having a plunger, the plunger being retracted when the switch is open and extended when the switch is closed, and including a cam mounted on the lever arm, the cam abutting on the plunger.

18. A device as defined in claim 16, wherein the lever arm is spring-biased, and wherein the actuator is a latching relay disposed relative to the lever arm so as to selectively latch the lever arm in dormant position and in turn-indicating positions.

19. A device as defined in claim 16, including a quadrant mounted on the lever arm, the quadrant having slots formed in its arced surface; and a spring-biased latching arm pivotally mounted on the relay and disposed so as to be selectively seated in one of the slots in the quadrant, and lifted from the slot and seated in another of the slots upon energizing of the relay.

20. A device for timing the duration of operation of a vehicular turn indicator which comprises:
- (a) a lever arm for manually controlling a vehicular turn indicator, the lever arm being movable from a dormant position to a position for indicating a vehicular turn, and the lever arm being spring-biased to dormant position;
- (b) a suitably grounded electrical actuator mechanically linked to the lever arm;
- (c) a normally closed and suitably grounded electrical switch mechanically linked to the actuator, the lever arm, the actuator and the switch being disposed relative to each other so as to open the switch upon movement of the lever arm from dormant position, and for returning the lever arm to dormant position upon closing the switch;
- (d) a source of electrical energy;
- (e) a suitably grounded, high resistance relay electrically connected to the source of electrical energy, and electrically connected to the actuator;
- (f) a suitably grounded capacitor of high capacity, electrically connected to the relay and to the switch, the relay being energized when the capacitor charges to a sufficient level;
- (g) resistor means electrically connected to the source of electrical energy, and electrically connected in the charging path of the capacitor to ground; and
- (h) means associated with the lever arm for selectively grounding the electrical connection between the capacitor and the switch.

21. A device as defined in claim 20, wherein the means for selectively grounding the electrical connection between the capacitor and the switch comprises:
- (a) a first contact point electrically connected to the electrical connection between the capacitor and the switch;
- (b) a second, suitably grounded contact point mounted adjacent one end of the lever arm; and
- (c) means associated with the lever arm for selectively bringing the second contact point into electrical contact with the first contact point and retaining the electrical contact therebetween.

22. A device as defined in claim 21, wherein the means for bringing and retaining the contact points in electrical contact with each other comprises a track having a first elongate slot, a second elongate slot substantially parallel to the first elongate slot, and a transverse slot therebetween, the lever arm being slidably disposed in said first elongate slot and being manually movable to the second elongate slot so that, when the lever arm is disposed in the second elongate slot, the second contact point will be brought into and retained in electrical contact with the first contact point.

References Cited by the Examiner

UNITED STATES PATENTS

| | | | |
|---|---|---|---|
| 2,308,097 | 1/1943 | Murray | 340—56 |
| 2,845,608 | 7/1958 | Short | 340—56 |
| 3,110,011 | 11/1963 | Burson | 340—56 |
| 3,128,447 | 4/1964 | Eaves | 340—56 |

ORIS L. RADER, *Primary Examiner.*

T. J. MADDEN, *Assistant Examiner.*